(12) United States Patent
Chen et al.

(10) Patent No.: US 10,815,415 B2
(45) Date of Patent: *Oct. 27, 2020

(54) METHODS AND COMPOSITIONS FOR INHIBITING SULFIDE STRESS CRACKING

(71) Applicant: HALLIBURTON ENERGY SERVICES, INC., Houston, TX (US)

(72) Inventors: Gong Chen, Houston, TX (US); Juanita M. Cassidy, Duncan, OK (US); Jim L. Lane, Duncan, OK (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/511,225

(22) PCT Filed: Oct. 16, 2014

(86) PCT No.: PCT/US2014/060802
§ 371 (c)(1),
(2) Date: Mar. 14, 2017

(87) PCT Pub. No.: WO2016/060664
PCT Pub. Date: Apr. 21, 2016

(65) Prior Publication Data
US 2017/0247600 A1    Aug. 31, 2017

(51) Int. Cl.
*C09K 8/54* (2006.01)
*C09K 8/532* (2006.01)
*C10G 75/04* (2006.01)
*E21B 41/00* (2006.01)

(52) U.S. Cl.
CPC .............. *C09K 8/532* (2013.01); *C09K 8/54* (2013.01); *C10G 75/04* (2013.01); *E21B 41/00* (2013.01); *C09K 2208/20* (2013.01); *C09K 2208/32* (2013.01)

(58) Field of Classification Search
CPC ........ C09K 2208/32; C09K 8/54; C09K 8/74; C09K 2208/20; C09K 8/532; C09K 8/035; C09K 8/536; C09K 2208/10; C09K 2208/22; C09K 8/03; C09K 8/52; C09K 8/528; C09K 8/72; C09K 8/805; C09K 2208/12; C09K 2208/18; C09K 2208/26; C09K 2208/28; C09K 2208/30; C09K 8/06; C09K 8/08; C09K 8/12; C09K 8/36; C09K 8/5045; C09K 8/5083; C09K 8/5086; C09K 8/512; C09K 8/524; C09K 8/602; C09K 8/605; C09K 8/68; C09K 8/685; C09K 8/725; C09K 8/86; C09K 8/887; E21B 41/02; E21B 43/26; E21B 10/00; E21B 21/00; E21B 21/06; E21B 37/06; E21B 41/00; E21B 43/267; E21B 7/00

See application file for complete search history.

(56) References Cited

U.S. PATENT DOCUMENTS

| | | | |
|---|---|---|---|
| 3,585,069 A | | 6/1971 | Owsley et al. |
| 3,669,613 A | | 6/1972 | Knox et al. |
| 4,949,790 A | | 8/1990 | Dill et al. |
| 5,152,916 A | * | 10/1992 | Hoffmann .......... B01D 53/1493 252/189 |
| 5,411,670 A | | 5/1995 | Walker |
| 5,591,381 A | | 1/1997 | Walker |
| 5,697,443 A | | 12/1997 | Brezinski et al. |
| 6,942,037 B1 | * | 9/2005 | Arnold .................. C09K 8/532 166/300 |
| 2005/0197257 A1 | | 9/2005 | Bouwmeester |
| 2007/0071887 A1 | * | 3/2007 | Cassidy .................. C09K 8/54 427/97.7 |
| 2010/0261623 A1 | | 10/2010 | Cassidy et al. |
| 2012/0142563 A1 | | 6/2012 | Cassidy et al. |
| 2013/0112418 A1 | * | 5/2013 | Varadaraj ................. C09K 8/54 166/305.1 |

FOREIGN PATENT DOCUMENTS

| | | | |
|---|---|---|---|
| EP | 0139567 A2 | | 5/1985 |
| EP | 0593230 | * | 4/1994 |

OTHER PUBLICATIONS

Canadian Office Action from Canadian Patent Applicsation No. 2,961,178, dated Mar. 2, 2018, 3 pages.
International Search Report and Written Opinion for PCT/US2014/060802, dated Jul. 14, 2015.

* cited by examiner

*Primary Examiner* — Kumar R Bhushan
(74) *Attorney, Agent, or Firm* — Thomas Rooney; C. Tumey Law Group PLLC

(57) ABSTRACT

Sulfide stress cracking of a metal component may be inhibited by treating the metal component with a mixture comprising at least one organic aldehyde and at least one surfactant. Such metal components may be those suitable for use in a downhole environment, at a well site, in a storage facility, in a transportation infrastructure, in a refinery facility, and any combination thereof where the metal component may be exposed to hydrogen sulfide.

12 Claims, 2 Drawing Sheets

METHODS AND COMPOSITIONS FOR INHIBITING SULFIDE STRESS CRACKING

BACKGROUND

The exemplary embodiments described herein relate to methods and compositions for inhibiting sulfide stress cracking.

Hydrogen sulfide stress cracking, also referred to as hydrogen sulfide embrittlement and sulfide cracking, is a form of metal failure that is different from, and not necessarily related to, normal corrosion. In some instances, sulfide cracking may occur even in the absence of substantive corrosion from oxidation, hydrogen generation, metal removal, and the like. Thus, in many instances, corrosion inhibitors that address the foregoing types of corrosion have proven to be relatively ineffective in the prevention of sulfide cracking.

Sulfide cracking is a localized form of corrosion that normally occurs at locations where the metal is stressed, for example, from an applied stress or a residual stress (e.g., due to cold working or at weld points), and exposed to hydrogen sulfide, especially in an environment suitable for normal corrosion (e.g., acidic or brine). Under hydrogen sulfide-free conditions, atomic hydrogen in the local environment combines predominantly at the surface to form molecular hydrogen ($H_2$ gas), which produces bubbles on the surface. In a hydrogen sulfide environment, it is believed that the hydrogen sulfide retards the recombination of the atomic hydrogen to molecular hydrogen, thereby allowing the atomic hydrogen to enter the metal and form the molecular hydrogen between the grain boundaries of the metal. The molecular hydrogen between the grain boundaries exerts force from within the metal, which causes cracks and fissures that greatly reduce the strength of the metal. Because this portion of the metal is under stress, the cracks often lead to catastrophic failure of the metal and, consequently, the equipment the metal is a component thereof. For example, sulfide cracking to a coiled tubing or other tubular can cause the tubing to completely break at the sulfide cracking site. Then, expensive and time-consuming fishing operations are needed to retrieve the portion of the tubing that has broken away.

Generally, sulfide cracking is most prevalent at moderate temperatures (e.g., about ambient temperature to about 200° F.). Therefore, sulfide cracking is relevant not only to downhole environments, but also equipment like pumps used at the surface of the well site, storage facilities, transportation infrastructure (e.g., pipelines), and refinery facilities.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
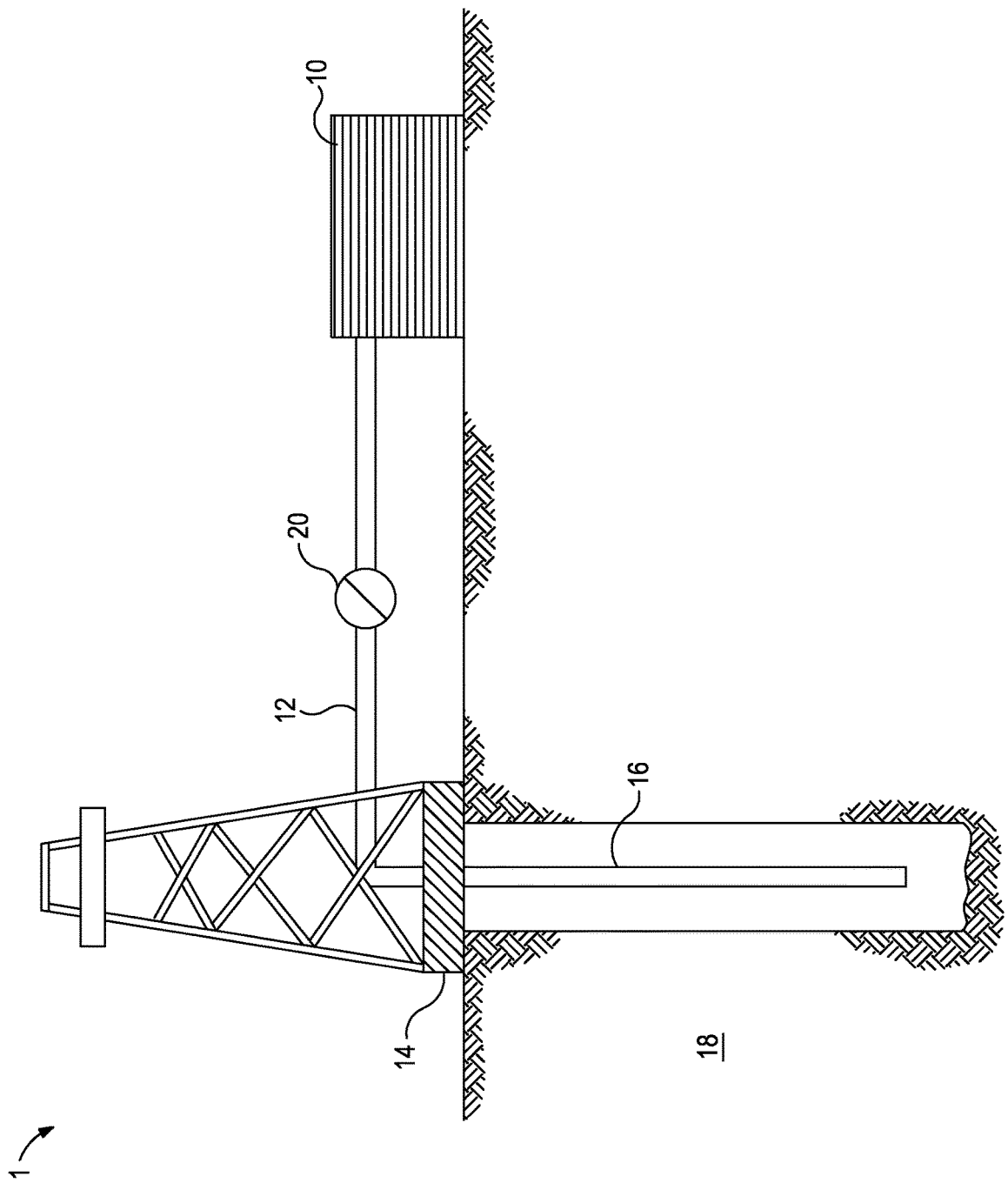
FIG. 1 provides an illustrative diagram of a system that can deliver sulfide cracking inhibitors described herein to a downhole location, according to one or more embodiments.

The exemplary embodiments described herein relate to methods and compositions for inhibiting sulfide stress cracking.

The sulfide cracking inhibitors described herein use a combination of aldehydes and surfactants. It has been observed that, in some instances, aldehydes and surfactants separately provide little to no inhibition to sulfide cracking of metals. For example, in some instances in the presence of an aldehyde alone, a metal in a saturated hydrogen sulfide environment visibly displayed cracks faster than without a sulfide cracking inhibitor. In another example, an aldehyde alone tripled the time before cracking. Therefore, the discovery that the combination of aldehydes and surfactants appear to synergistically to significantly inhibit sulfide cracking was unexpected. For example, in some instances, the combination of aldehydes and surfactants increased the time before cracking of the metal by over 250 times. Therefore, the methods and compositions described herein using a combination of aldehydes and surfactants may be particularly useful in inhibiting sulfide cracking of metal components in downhole environments, a well site, storage facilities, transportation infrastructure, and refinery facilities.

Additionally, at least some of the aldehydes and surfactants of the sulfide cracking inhibitors described herein meet strict environmental standards set forth for use in the North Sea by the Oslo Paris Commission, which focuses on the effects of aquatic organisms. Therefore, at least some of the sulfide cracking inhibitors described herein may be suitable for use in regions with more stringent environmental regulations.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

The sulfide cracking inhibitors described herein use a combination of aldehydes and surfactants.

Aldehydes suitable for use in conjunction with the sulfide cracking inhibitors described herein may include compounds having the general formula R—C(O)H where R may be an H, a $C_1$-$C_{14}$ alkyl group, a $C_5$-$C_{14}$ cyclic group, or a $C_6$-$C_{14}$ aryl group. As used herein, the term "alkyl group" refers to a moiety of carbon and hydrogen where the carbon is a chain that may be linear or branched and saturated or unsaturated. As used herein, the term "cyclic group" refers to a moiety of carbon and hydrogen where at least some of the carbon atoms form at least one ring that may be saturated or unsaturated and may have pendent alkyl groups. As used herein, the term "aryl group" refers to a moiety of carbon and hydrogen where at least some of the carbon atoms form an aromatic ring and may have pendent alkyl groups.

Specific examples of aldehydes that may be suitable for use in conjunction with the sulfide cracking inhibitors described herein include, but are not limited to, formaldehyde, acetaldehyde, propionaldehyde, butyraldehyde, benzaldehyde, cinnamaldehyde, tolualdehyde, and the like, and any combination thereof.

Surfactants suitable for use in conjunction with the sulfide cracking inhibitors described herein may include, but are not limited to, polyoxyethylene glycol alkyl ethers (e.g., BRIJ™ surfactants available from Sigma-Aldrich), alkylphenol ethoxylates (e.g., TRITON™ X and TERGITOL™ NP surfactants available from DOW Chemical and IGEPAL® available from Sigma-Aldrich), ethoxylated fatty acids (e.g., polyethoxylated tallow acid), poly(ethylene glycol) sorbitol hexaoleate, poly(ethylene glycol) sorbitan tetraoleate, ethoxylated fatty amines (e.g., cocoamine ethoxylate), polysorbates (e.g., TWEEN® surfactants available from Sigma-Aldrich), glycerol surfactants, glucoside surfactants, cocamide surfactants, betaine surfactants, sulfate surfactants, sulfonate surfactants, phosphate surfactants, carboxylate surfactants, amine surfactants, and the like.

In some embodiments, the weight ratio of the aldehyde to the surfactant in the sulfide cracking inhibitor may be about 20:1 to about 1:20, including any subset therebetween (e.g., about 10:1 to about 1:10, about 1:1 to about 1:10, or about 10:1 to about 1:1).

In some embodiments, a metal component may be treated with a sulfide cracking inhibitor described herein by contacting the metal component with a neat sulfide cracking inhibitor (e.g., absent a fluid or additional fluid).

In some embodiments, a sulfide cracking inhibitor described herein may be added to a fluid produced from a subterranean formation (e.g., oil, natural gas, water, and the like). For example, a sulfide cracking inhibitor described herein is useful when added to a sour fluid produced from a subterranean formation to mitigate sulfide cracking of metal components of storage facilities, transportation infrastructure, and refinery facilities. As used herein, the term "sour fluid" refers to a fluid that comprises hydrogen sulfide. In some embodiments, the addition of the sulfide cracking inhibitor may be when the fluid is produced or at any point thereafter and may optionally occur more than once.

In some instances, the sulfide cracking inhibitors described herein may be included in a fluid for treating a metal to inhibit sulfide cracking. Exemplary fluids may include, but are not limited to, fresh water, saltwater (e.g., water containing one or more salts dissolved therein), brine (e.g., saturated salt water), seawater, and any combination thereof. In some instances, the fluid may be acidic (i.e., have a pH less than 7) and include at least 0.1% acid by weight of water (e.g., hydrochloric acid, acetic acid, formic acid, and the like). In some instances, the acid may be included in the fluid at a concentration of about 0.1% by weight of water to about 40% by weight of water. The concentration of acid may depend on the acid composition and the desired pH.

In some embodiments, the sulfide cracking inhibitors described herein may be included in the fluid in an amount of about 0.01% to about 10% by weight of the fluid, including any subset therebetween (e.g., about 0.01% to about 5%, about 0.1% to about 5%, or about 0.1% to about 1%).

The metal component may be at least a portion of a piece of equipment suitable for use in downhole environment (e.g., a casing, a tubular, a drill string, a perforating tool, a crossover tool, a sandscreen, a valve, a conveyance like a wireline or coiled tubing, a motor, and the like), at the surface of a well site (e.g., a pump, a valve, a mixing tank, and the like), in a storage facility (e.g., a container, a valve, a tubular, a piping, and the like), in a transportation infrastructure (e.g., a pipeline, a valve, a pump, a manifold, and the like), and in a refinery facility (e.g., a pipeline, a valve, a pump, a manifold, and the like).

In some embodiments, the metal component may be contacted with or otherwise exposed to hydrogen sulfide, which may occur during and/or after treatment with the sulfide cracking inhibitor described herein. For example, a metal component of a pump or a pipeline may be treated with a sulfide cracking inhibitor before assembling the pump or pipeline. In yet another example, a sulfide cracking inhibitor described herein may be added to a sour fluid. Then, a metal component of a storage facility, a transportation infrastructure, or a refinery facility may be treated with the sulfide cracking inhibitor as it is exposed to the hydrogen sulfide.

In some embodiments, a sulfide cracking inhibitor described herein may be included in a drilling fluid used in drilling a wellbore penetrating a subterranean formation. In some instances, a sour fluid may be encountered when drilling where the inclusion of the sulfide cracking inhibitor may inhibit sulfide cracking of metal components of equipment downhole and uphole (e.g., a drill string and a pump).

In some embodiments, a sulfide cracking inhibitor described herein may be included in a completion fluid used for completing the preparation of a wellbore for hydrocarbon production after it has been drilled. Exemplary completion operations may include, but are not limited to, primary cementing of casing and liners in the wellbore, placing light weight flotation barriers over caverned liquid hydrocarbons, consolidating gravel packs or incompetent sands in the subterranean formation, and the like.

In some embodiments, a sulfide cracking inhibitor described herein may be used in an acidizing fluid. An acidizing fluid (e.g., comprising an acidic fluid, typically less than pH 5) may be introduced into a wellbore penetrating a subterranean formation at or below the matrix pressure of the formation. Typically, the acidizing fluid reacts with the formation (e.g., at the faces of the formation in the cracks, fissures, vugs, and pores therein) to increase the porosity of the formation.

In some embodiments, systems that include at least one metal component may be configured for treating the at least one metal component with a sulfide cracking inhibitor described herein. In various embodiments, the systems may comprise a pump fluidly coupled to a tubular, the tubular containing a fluid (e.g., a drilling fluid, a completion fluid, an acidizing fluid, or the like) comprising an organic aldehyde and a surfactant.

The pump may be a high pressure pump in some embodiments. As used herein, the term "high pressure pump" will refer to a pump that is capable of transporting a fluid at a pressure of about 1000 psi or greater. A high pressure pump may be used when it is desired to introduce the fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the fluid to the high pressure pump. In such embodiments, the low pressure pump may "step up" the pressure of the fluid before it reaches the high pressure pump.

In some embodiments, the systems described herein can further comprise a mixing tank that is upstream of the pump and in which the fluid is formulated. In various embodiments, the pump (e.g., a low pressure pump, a high pressure pump, or a combination thereof) may convey the fluid from the mixing tank or other source of the fluid to the tubular. In other embodiments, however, the fluid can be formulated offsite and transported to a worksite, in which case the fluid may be introduced to the tubular via the pump directly from its shipping container (e.g., a truck, a railcar, a barge, or the like) or from a transport pipeline. In either case, the fluid may be drawn into the pump, elevated to an appropriate pressure, and then introduced into the tubular, for example, for delivery downhole or transportation to another location.

In various embodiments, systems configured for varying and delivering the fluids described herein to a downhole location may include a mixing system fluidly coupled to a pump fluidly coupled to a tubular extending into a wellbore penetrating a subterranean formation. As used herein, the terms "fluid communication," "fluidly communicable," "fluidly coupled," and the like refer to two or more components, systems, etc. being coupled such that fluid from one may flow to the other. In some embodiments, other components, systems, etc. may be disposed between the two or more components that are fluidly communicable. For example, valves, flow meters, pumps, mixing tanks, holding tanks, tubulars, separation systems, and the like may be disposed between two or more components that are fluidly communicable.

FIG. 1 shows an illustrative schematic of a system 1 in which a sulfide cracking inhibitor described herein may be implemented. In some instances, at least one metal component of at least one piece of equipment associated with the system 1 may have been treated with the sulfide cracking inhibitor. In some instances, the sulfide cracking inhibitor may be included in a fluid used in the drilling assembly 100. A combination of the foregoing may also be implemented. It should be noted that while FIG. 1 generally depicts a land-based system, it is to be recognized that like systems may be operated in subsea locations as well.

As depicted in FIG. 1, system 1 may include mixing tank 10, in which a fluid that includes a sulfide cracking inhibitor described herein may be formulated. The fluid may be conveyed via line 12 to wellhead 14, where the fluid enters tubular 16, tubular 16 extending from wellhead 14 into subterranean formation 18. In some instances, one or more of the mixing tank 10, the line 12, the wellhead 14, or the tubular 16 may be or include a metal component of the system 1. Upon being ejected from tubular 16, the fluid may subsequently penetrate into subterranean formation 18. In some instances, tubular 16 may have a plurality of orifices (not shown) through which the fluid of the present disclosure may enter the wellbore proximal to a portion of the subterranean formation 18 to be treated. In some instances, the wellbore may further comprise equipment or tools (not shown), which may be or include a metal component of the system 1, for zonal isolation of a portion of the subterranean formation 18 to be treated.

Pump 20, which may be or include a metal component of the system 1, may be configured to raise the pressure of the fluid to a desired degree before its introduction into tubular 16. It is to be recognized that system 1 is merely exemplary in nature and various additional components may be present that have not necessarily been depicted in FIG. 1 in the interest of clarity. Non-limiting additional components, each of which may be or include a metal component of the system 1, that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the fluid may, in some embodiments, flow back to wellhead 14 and exit subterranean formation 18. In some embodiments, the fluid that has flowed back to wellhead 14 may subsequently be recovered and recirculated to subterranean formation 18. In some embodiments, the fluid that has flowed back to wellhead 14 may subsequently be transported to another location (e.g., via a pipeline and a pump, not shown) or stored on site (e.g., in a container, not shown). In some instances, the transportation infrastructure, the storage infrastructure, or both may be or include a metal component of the system 1.

It is also to be recognized that the disclosed fluids may also directly or indirectly affect the various downhole equipment and tools that may come into contact with the fluids during operation of either system 1. Such equipment and tools, which may be or include a metal component of the system 1, may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Figure 2:
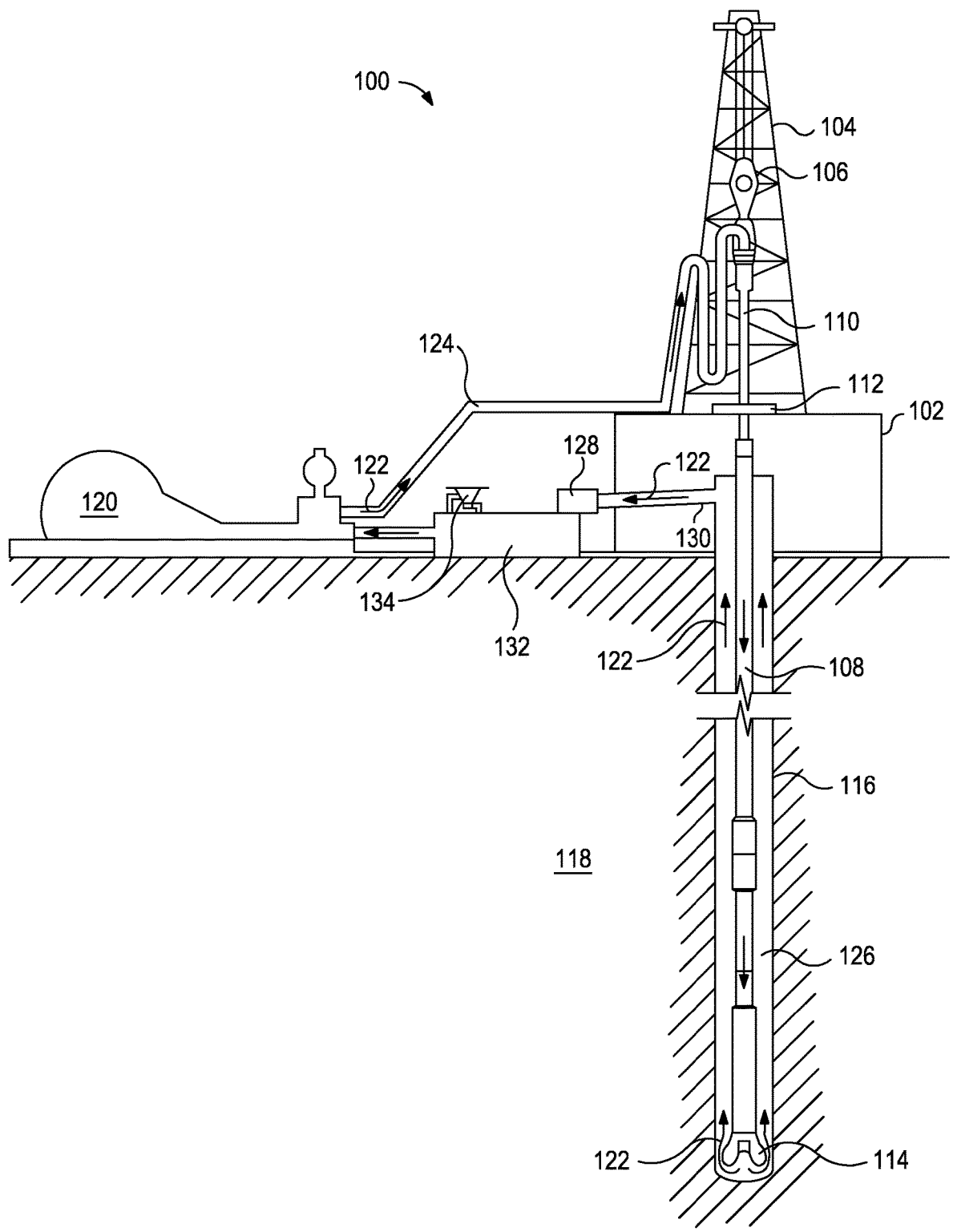
FIG. 2 provides an illustrative diagram of a drilling assembly in which sulfide cracking inhibitors described herein may be implemented, according to one or more embodiments.

FIG. 2 shows an illustrative schematic of another system, specifically a wellbore drilling assembly 100, in which a sulfide cracking inhibitor described herein may be implemented. In some instances, at least one metal component of at least one piece of equipment associated with the drilling assembly 100 may have been treated with the sulfide cracking inhibitor. In some instances, the sulfide cracking inhibitor may be included in a drilling fluid used in the drilling assembly 100. A combination of the foregoing may also be implemented.

It should be noted that while FIG. 2 generally depicts a land-based drilling assembly 100, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

In some instances, a sulfide cracking inhibitor described herein may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed sulfide cracking inhibitor may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the disclosed sulfide cracking inhibitor may be stored, reconditioned, and/or regulated until added to the drilling fluid 122.

As mentioned above, the disclosed sulfide cracking inhibitor may directly or indirectly affect the components and equipment of the drilling assembly 100. For example, the disclosed sulfide cracking inhibitor may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, The fluid processing unit(s) 128 may further include one or more sensors, gauges, pumps, compressors, and the like used to store, monitor, regulate, and/or recondition the drilling fluid comprising the sulfide cracking inhibitor.

The disclosed sulfide cracking inhibitor may directly or indirectly affect the pump 120, which representatively includes any conduits, pipelines, trucks, tubulars, and/or pipes used to fluidically convey the drilling fluid downhole, any pumps, compressors, or motors (e.g., topside or downhole) used to drive the drilling fluid into motion, any valves or related joints used to regulate the pressure or flow rate of the drilling fluid, and any sensors (i.e., pressure, temperature, flow rate, etc.), gauges, and/or combinations thereof, and the like. The disclosed sulfide cracking inhibitor may also directly or indirectly affect the mixing hopper 134 and the retention pit 132 and their assorted variations.

The disclosed sulfide cracking inhibitor may also directly or indirectly affect the various downhole equipment and tools that may come into contact with the sulfide cracking inhibitor such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed sulfide cracking inhibitor may also directly or indirectly affect any downhole heat exchangers, valves and corresponding actuation devices, tool seals, packers and other wellbore isolation devices or components, and the like associated with the wellbore 116. The disclosed sulfide cracking inhibitor may also directly or indirectly affect the drill bit 114, which may include, but is not limited to, roller cone bits, PDC bits, natural diamond bits, any hole openers, reamers, coring bits, etc.

Embodiments disclosed herein include Embodiment A, Embodiment B, and Embodiment C.

Embodiment A: A method including contacting a metal component with a mixture comprising at least one organic aldehyde and at least one surfactant, wherein sulfide stress cracking of the metal component when contacted with hydrogen sulfide is inhibited.

Embodiment A may have one or more of the following additional elements in any combination: Element A1: the method further including contacting the metal component with hydrogen sulfide; Element A2: wherein the mixture further comprises a fluid; Element A3: Element A2 wherein the fluid comprises salt; Element A4: Element A2 wherein the fluid has a pH less than 7; Element A5: Element A2 wherein the fluid is an acidic brine; Element A6: wherein the metal component is a portion of a coiled tubing; Element A7: wherein the metal component is a portion of a pump; Element A8: wherein the metal component is a portion of a transportation pipeline; Element A9: wherein the metal component is a portion of a storage container; Element A10: wherein the least one surfactant comprises at least one selected from the group consisting of: a polyoxyethylene glycol alkyl ether, an alkylphenol ethoxylate, a ethoxylated fatty acid, a poly(ethylene glycol) sorbitol hexaoleate, a poly(ethylene glycol) sorbitan tetraoleate, an ethoxylated fatty amine, a polysorbate, a glycerol surfactant, a glucoside surfactant, a cocamide surfactant, a betaine surfactant, a sulfate surfactant, a sulfonate surfactant, a phosphate surfactant, a carboxylate surfactant, and an amine surfactant; Element A11: wherein the organic aldehyde comprises at least one selected from the group consisting of: formaldehyde, acetaldehyde, propionaldehyde, butyraldehyde, benzaldehyde, cinnamaldehyde, and tolualdehyde; Element A12: wherein the sulfide stress cracking of the metal component when contacted with hydrogen sulfide and a fluid comprising salt is inhibited; Element A13: wherein the sulfide stress cracking of the metal component when contacted with hydrogen sulfide and an acidic fluid is inhibited; Element A14: wherein the sulfide stress cracking of the metal component when contacted with hydrogen sulfide and an acidic brine is inhibited; and Element A15: wherein the metal component is suitable for use in a downhole environment, at a well site, in a storage facility, in a transportation infrastructure, in a refinery facility, and any combination thereof.

By way of non-limiting example, exemplary combinations applicable to Embodiment A include: Element A10 in combination with Element A11 and optionally at least one of Elements A3-A5; Element A1 in combination with at least one of Elements A2-A5; at least one of Elements A6-A9 in combination with any of the foregoing; at least one of Elements A6-A9 in combination with at least one of Elements A2-A5; at least one of Elements A6-v in combination with at least one of Elements A12-A15 and optionally at least one of Elements A10-A11; and so on.

Embodiment B: A piece of equipment including a metal component treated with a mixture comprising at least one organic aldehyde and at least one surfactant, wherein sulfide stress cracking of the metal component when contacted with hydrogen sulfide is inhibited.

Embodiment B may have one or more of the following additional elements in any combination: Element B1: wherein the at least one surfactant comprises at least one selected from the group consisting of: a polyoxyethylene glycol alkyl ether, an alkylphenol ethoxylate, a ethoxylated fatty acid, a poly(ethylene glycol) sorbitol hexaoleate, a poly(ethylene glycol) sorbitan tetraoleate, an ethoxylated fatty amine, a polysorbate, a glycerol surfactant, a glucoside surfactant, a cocamide surfactant, a betaine surfactant, a sulfate surfactant, a sulfonate surfactant, a phosphate surfactant, a carboxylate surfactant, and an amine surfactant; Element B2: wherein the organic aldehyde comprises at least one selected from the group consisting of: formaldehyde, acetaldehyde, propionaldehyde, butyraldehyde, benzaldehyde, cinnamaldehyde, and tolualdehyde; Element B3: wherein the piece of equipment is selected from the group consisting of: a casing, a tubular, a piping, a pipeline, a drill string, a perforating tool, a crossover tool, a sandscreen, a valve, a wireline, coiled tubing, a motor, a pump, a mixing tank, a container, and a manifold; Element B4: wherein the sulfide stress cracking of the metal component when contacted with hydrogen sulfide and a fluid comprising salt is inhibited; Element B5: wherein the sulfide stress cracking of the metal component when contacted with hydrogen sulfide and an acidic fluid is inhibited; Element B6: wherein the sulfide stress cracking of the metal component when contacted with hydrogen sulfide and an acidic brine is inhibited; and Element B7: wherein the piece of equipment is suitable for use in a downhole environment, at a well site, in a storage facility, in a transportation infrastructure, in a refinery facility, and any combination thereof.

By way of non-limiting example, exemplary combinations applicable to Embodiment B include: Element B1 in combination with Element B2 and optionally at least one of Elements B4-B7; Element B1 in combination with Element B3 and optionally at least one of Elements B4-B7; Element B2 in combination with Element B3 and optionally at least one of Elements B4-B7; Element B1 in combination with Elements B2-B3 and optionally at least one of Elements B4-B7; Element B3 in combination with at least one of Elements B4-B7 and optionally at least one of Elements B1-B2; and so on.

Embodiment C: A system including a tubular formed at least in part by a metal; and a mixture contained within the tubular, the mixture comprising at least one organic aldehyde and at least one surfactant, wherein sulfide stress cracking of the metal component when contacted with hydrogen sulfide is inhibited.

Embodiment C may have one or more of the following additional elements in any combination: Element C1: wherein at least a portion of the tubular extends into a subterranean formation; Element C2: wherein the tubular is at least a portion of a pipeline; Element C3: wherein the tubular further contains hydrogen sulfide; Element C4: wherein the sulfide stress cracking of the metal component when contacted with hydrogen sulfide and a fluid comprising salt is inhibited; Element C5: wherein the sulfide stress cracking of the metal component when contacted with hydrogen sulfide and an acidic fluid is inhibited; and Element C6: wherein the sulfide stress cracking of the metal component when contacted with hydrogen sulfide and an acidic brine is inhibited; Element C7: wherein the piece of equipment is suitable for use in a downhole environment, at a well site, in a storage facility, in a transportation infrastructure, in a refinery facility, and any combination thereof; Element C8: wherein the least one surfactant comprises at least one selected from the group consisting of: a polyoxyethylene glycol alkyl ether, an alkylphenol ethoxylate, a ethoxylated fatty acid, a poly(ethylene glycol) sorbitol hexaoleate, a poly(ethylene glycol) sorbitan tetraoleate, an ethoxylated fatty amine, a polysorbate, a glycerol surfactant, a glucoside surfactant, a cocamide surfactant, a betaine surfactant, a sulfate surfactant, a sulfonate surfactant, a phosphate surfactant, a carboxylate surfactant, and an amine surfactant; and Element C9: wherein the organic aldehyde comprises at least one selected from the group consisting of: formaldehyde, acetaldehyde, propionaldehyde, butyraldehyde, benzaldehyde, cinnamaldehyde, and tolualdehyde.

By way of non-limiting example, exemplary combinations applicable to Embodiment C include: Element C8 in combination with Element C9 and optionally at least one of Elements C4-C7; Element C8 in combination with Element C3 and optionally at least one of Elements C4-C7; Element C9 in combination with Element C3 and optionally at least one of Elements C4-C7; Element C8 in combination with Elements C9-C3 and optionally at least one of Elements C4-C7; Element C3 in combination with at least one of Elements C4-C7 and optionally at least one of Elements C8-C9; Element C1 or Element C2 in combination with any of the foregoing; and so on.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Sulfide stress cracking of a metal C-ring was tested when exposed to two different test fluids (Table 1) saturated with hydrogen sulfide. The metal C-rings were made of low alloy carbon steel with OD of 2.00 inch, wall thickness of 0.175 inch and width of 0.625 inch. The C-rings were heat treated to Rockwell (C) hardness ("HRC") of 35±1. The C-rings were stressed to 100% yield stress and submerged in the test fluid. The C-rings were stressed during the full testing period while submerged in the test fluid. The failure time was recorded when cracks became visible in the C-ring (Table 1).

TABLE 1

| | Failure Time in 75° F. Test Fluid Saturated with Hydrogen Sulfide | |
| --- | --- | --- |
| Additive | 5% NaCl and 1.0% Acetic Acid Solution (pH = 2.6) | 15% HCl |
| none | 5 hours | 4 hours |
| 0.1% SCA130 ™ * | 4 days | 20 hours |
| 0.1% SCA-130 ™ and 0.05% cocoamine ethoxylated surfactant | | <20 hours |
| 0.1% benzaldehyde | 15 hours | 3.5 hours |
| 0.1% benzaldehyde and 0.05% cocoamine ethoxylated surfactant | >56 days | >14 days |

* SCA-130 is the condensation product of acetaldehyde commercially available from Halliburton Energy Services, Inc., which inhibits hydrogen sulfide cracking.

The present example illustrates the unexpected synergistic effects of the organic aldehyde and the surfactant.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
    forming a neat mixture of at least one organic aldehyde comprising cinnamaldehyde and at least one surfactant comprising a cocamide surfactant; and
    treating at least one metal component with the mixture before using the at least one metal component,
    wherein the mixture increases the time before cracking of the at least one metal component by at least 250 times.

2. The method of claim 1 further comprising:
    contacting the metal component with hydrogen sulfide.

3. The method of claim 1, wherein a ratio of the at least one organic aldehyde to the at least one surfactant is about 20:1 to about 1:20.

4. The method of claim 1, wherein the mixture further comprises a fluid comprising salt.

5. The method of claim 1, wherein the mixture further comprises a fluid having a pH less than 7.

6. The method of claim 1, wherein the mixture further comprises an acidic brine.

7. The method of claim 1, wherein the metal component is a portion of a coiled tubing and the local environment resides in a wellbore penetrating the subterranean formation.

8. The method of claim 1, wherein the metal component is a portion of a pump.

9. The method of claim 1, wherein the metal component is a portion of a transportation pipeline.

10. The method of claim 1, wherein the metal component is a portion of a storage container.

11. The method of claim 1, wherein the least one surfactant further comprises at least one selected from the group consisting of: a polyoxyethylene glycol alkyl ether, an alkylphenol ethoxylate, a ethoxylated fatty acid, a poly(ethylene glycol) sorbitol hexaoleate, a poly(ethylene glycol) sorbitan tetraoleate, an ethoxylated fatty amine, a polysorbate, a glycerol surfactant, a glucoside surfactant, a betaine surfactant, a sulfate surfactant, a sulfonate surfactant, a phosphate surfactant, a carboxylate surfactant, and an amine surfactant.

12. The method of claim 1, wherein the organic aldehyde comprises at least one selected from the group consisting of: formaldehyde, acetaldehyde, propionaldehyde, butyraldehyde, benzaldehyde, and tolualdehyde.

* * * * *